US012568264B2

(12) United States Patent
Oyama

(10) Patent No.: US 12,568,264 B2
(45) Date of Patent: Mar. 3, 2026

(54) CONTENT DISTRIBUTION SYSTEM IN WHICH VIEWER IS ABLE TO GIVE SOCIAL TIPPING TO EACH PERFORMER IN DISTRIBUTION OF MOVING IMAGE CONTENT GENERATED BY PHOTOGRAPHING PLURALITY OF PERFORMERS DELIVERING PERFORMANCES BY TURNS, CONTENT DISTRIBUTION METHOD, AND STORAGE MEDIUM

(71) Applicant: CANON KABUSHIKI KAISHA, Tokyo (JP)

(72) Inventor: Nana Oyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 18/497,307

(22) Filed: Oct. 30, 2023

(65) Prior Publication Data

US 2024/0155170 A1 May 9, 2024

(30) Foreign Application Priority Data

Nov. 4, 2022 (JP) ................................. 2022-177415

(51) Int. Cl.
*H04N 7/16* (2011.01)
*H04N 21/233* (2011.01)
(Continued)

(52) U.S. Cl.
CPC ......... *H04N 21/266* (2013.01); *H04N 21/233* (2013.01); *H04N 21/23418* (2013.01); *H04N 21/2543* (2013.01); *H04N 21/4751* (2013.01)

(58) Field of Classification Search
CPC .............. H04N 21/266; H04N 21/233; H04N 21/23418; H04N 21/2543; H04N 21/4751;
(Continued)

(56) References Cited

U.S. PATENT DOCUMENTS 7,716,245 B2 * 5/2010 Omae ................ G06Q 20/1235
707/787
9,887,887 B2 * 2/2018 Hunter .................... H04L 47/25
(Continued)

FOREIGN PATENT DOCUMENTS

JP 2020161040 A 10/2020

*Primary Examiner* — Sahar Aqil Riaz
(74) *Attorney, Agent, or Firm* — Venable LLP

(57) ABSTRACT

A content distribution system in which a viewer can give a social tipping to each performer is provided. The content distribution system includes a distribution unit that distributes a moving image content which a photographing apparatus captures a plurality of performers by turns, a login control unit that performs a login processing of a performer who starts a performance, a start detection unit that detects a start of the performance by the performer who has logged in, an end detection unit that detects an end of the performance by the performer who has logged in, a reception unit that receives a tip from a viewer, and a control unit that associates information corresponding to the tip received during a period from the start to the end of the performance by the logged in performer with information corresponding to the performer who has logged in.

11 Claims, 15 Drawing Sheets

(51) Int. Cl.

| | |
|---|---|
| *H04N 21/234* | (2011.01) |
| *H04N 21/2543* | (2011.01) |
| *H04N 21/266* | (2011.01) |
| *H04N 21/475* | (2011.01) |

(58) Field of Classification Search
CPC ........... H04N 21/2743; H04N 21/4784; H04N 21/4788; H04N 21/44218
USPC ............................................................. 725/1
See application file for complete search history.

(56) References Cited

U.S. PATENT DOCUMENTS

| | | | | |
|---|---|---|---|---|
| 11,615,663 | B1 * | 3/2023 | Chinoy | G07C 9/37 |
| | | | | 348/156 |
| 2005/0120865 | A1 * | 6/2005 | Tada | G10H 1/0058 |
| | | | | 84/600 |
| 2008/0153595 | A1 * | 6/2008 | Chickering | G06Q 30/02 |
| | | | | 463/42 |
| 2012/0272148 | A1 * | 10/2012 | Strober | H04N 21/6543 |
| | | | | 715/716 |
| 2013/0012790 | A1 * | 1/2013 | Horseman | A61B 5/6891 |
| | | | | 600/301 |
| 2014/0139863 | A1 * | 5/2014 | Harada | H04N 1/4426 |
| | | | | 358/1.14 |
| 2016/0183864 | A1 * | 6/2016 | Kusens | A61B 5/11 |
| | | | | 340/573.1 |
| 2016/0330084 | A1 * | 11/2016 | Hunter | H04L 47/2425 |
| 2017/0017905 | A1 * | 1/2017 | Boyer | G06Q 30/0202 |
| 2018/0323763 | A1 * | 11/2018 | Bailey | G06F 3/167 |
| 2021/0174427 | A1 * | 6/2021 | Isaacson | G06Q 30/0641 |
| 2021/0398029 | A1 * | 12/2021 | Royall, Jr. | G06Q 10/02 |
| 2022/0398561 | A1 * | 12/2022 | Hill | G06Q 20/28 |
| 2023/0009322 | A1 * | 1/2023 | Ito | G06Q 30/0283 |
| 2023/0098253 | A1 * | 3/2023 | Snell | A63F 13/213 |
| | | | | 463/31 |
| 2023/0191252 | A1 * | 6/2023 | Baba | A63F 13/215 |
| | | | | 463/31 |
| 2024/0005594 | A1 * | 1/2024 | Kanoria | A63F 13/655 |
| 2024/0082711 | A1 * | 3/2024 | Chiba | H04N 21/2187 |
| 2024/0121449 | A1 * | 4/2024 | Takeda | H04N 21/4318 |
| 2024/0373105 | A1 * | 11/2024 | Tomimori | H04N 7/173 |

* cited by examiner

FIG. 5

PERFORMER A

USER ID                    : AAA
ACCOUNT NAME               : Bach
NAME                       : TARO YAMADA
REMITTANCE DESTINATION     : BANK A

CONTENT DISTRIBUTION SYSTEM IN WHICH VIEWER IS ABLE TO GIVE SOCIAL TIPPING TO EACH PERFORMER IN DISTRIBUTION OF MOVING IMAGE CONTENT GENERATED BY PHOTOGRAPHING PLURALITY OF PERFORMERS DELIVERING PERFORMANCES BY TURNS, CONTENT DISTRIBUTION METHOD, AND STORAGE MEDIUM

BACKGROUND OF THE INVENTION

Field of the Invention

The present invention relates to a content distribution system, a content distribution method, and a storage medium.

Description of the Related Art

In recent years, individuals are increasingly distributing moving image contents in social networking services, moving image content distribution sites, and the like on the Internet. In particular, a system, in which a viewer gives a tip during live distribution performed on a channel established by an individual on a moving image sharing site on the Internet, has rapidly become widespread.

In the live distribution with a social tipping function, the tip is given online as financial support from the viewer to a provider of the moving image content, and the live distribution with the social tipping function is attracting attention as a means of monetization. For example, Japanese Laid-Open Patent Publication (kokai) No. 2020-161040 discloses a system, in which a plurality of different viewers give tips to one content distributor.

However, with the technique of Japanese Laid-Open Patent Publication (kokai) No. 2020-161040 described above, it is not possible for a viewer to give a tip to each performer in distribution of a moving image content generated by photographing a plurality of performers delivering performances by turns, such as street piano or street performances.

SUMMARY OF THE INVENTION

The present invention provides a content distribution system in which a viewer is able to give a tip to each performer in distribution of a moving image content generated by photographing a plurality of performers delivering performances by turns, a content distribution method, and a storage medium.

Accordingly, the present invention provides a content distribution system comprising a photographing apparatus configured to generate a moving image content by photographing a plurality of performers delivering performances by turns, a distribution unit configured to distribute the moving image content, a login control unit configured to perform a login processing of a performer of the plurality of performers who starts a performance, a start detection unit configured to detect a start of the performance by the performer who has logged in through the login processing, an end detection unit configured to detect an end of the performance by the performer who has logged in through the login processing, a reception unit configured to receive a tip from a viewer of the distributed moving image content, and a control unit configured to associate information corresponding to the tip received during a period from the start to the end of the performance by the performer who has logged in through the login processing with information corresponding to the performer who has logged in through the login processing.

According to the present invention, the viewer is able to give the tip to each performer in the distribution of the moving image content generated by photographing the plurality of performers delivering performances by turns.

Further features of the present invention will become apparent from the following description of exemplary embodiments with reference to the attached drawings.

BRIEF DESCRIPTION OF THE DRAWINGS

FIG. 5 is a diagram that shows an example of performer information in the preferred embodiment of the present invention.

DESCRIPTION OF THE EMBODIMENTS

Figure 1:
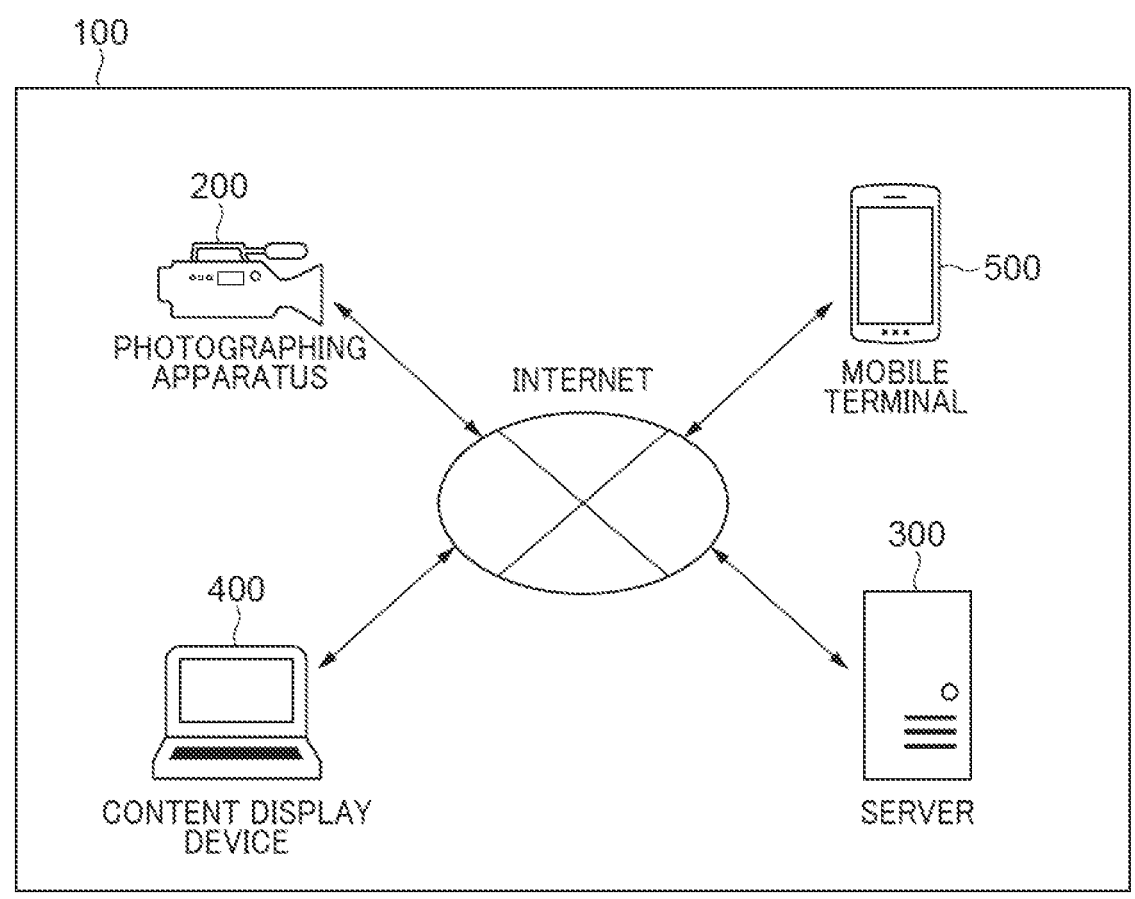
FIG. 1 is a configuration diagram that shows an example of a content distribution system according to a preferred embodiment of the present invention.

The present invention will now be described in detail below with reference to the accompanying drawings showing embodiments thereof.

Hereinafter, a preferred embodiment of the present invention will be described in detail with reference to the drawings. It should be noted that the following preferred embodiment does not limit the claimed invention. Although a plurality of features will be described below, all of the plurality of features are not necessarily essential to the present invention, and the plurality of features may be arbitrarily combined. Furthermore, in the accompanying drawings, the same or similar configurations are denoted by the same reference numerals, and redundant descriptions are omitted.

FIG. 1 is a configuration diagram that shows an example of a content distribution system 100 according to the preferred embodiment of the present invention. The content distribution system 100 includes a photographing apparatus 200, a server 300, a content display device 400, and a mobile terminal 500. It should be noted that, in the present preferred embodiment, it is assumed that these apparatuses (the photographing apparatus 200, the server 300, the content display device 400, and the mobile terminal 500) are connected to each other via the Internet and that control signals and data are transmitted and received between these apparatuses, but the present invention is not limited to this configuration. For example, a configuration, in which these apparatuses are connected to each other via dedicated lines or physical cables depending on requirements of concealability, confidentiality, and an allowable transmission delay of data to be handled, may be used.

The photographing apparatus 200 is installed in a facility or the like where performer(s) deliver performance(s). The photographing apparatus 200 includes a photographing function and generates a content by photographing a performer delivering a performance. The content is, for example, a moving image content that includes a video and a sound. In addition, the photographing apparatus 200 includes a function of reading code information such as a QR code (registered trademark) held over the photographing apparatus 200 by the performer. The photographing apparatus 200 acquires performer information from the code information that is read by this function. The performer information is information related to the performer who delivers the performance, and details of the performer information will be described below with reference to FIG. 5. Furthermore, the photographing apparatus 200 includes a function of connecting to the Internet by using a wireless communication method such as a public wireless communication network or Wi-Fi or a wired communication method such as a local area network (LAN) cable and transmitting the content and the performer information to the server 300. It should be noted that, in the present preferred embodiment, a video camera is used as the photographing apparatus 200, but the photographing apparatus 200 is not limited to the video camera. For example, the photographing apparatus 200 may be an apparatus including the above-described functions such as a smartphone, a tablet terminal, or a network camera that includes the above-described functions.

The server 300 includes a function of connecting to the Internet by using a wireless communication method or a wired communication method and transmitting and receiving various kinds of data and various kinds of commands between the apparatuses. In addition, the server 300 includes a server function that performs distribution of the content and management of a tip in an aggregating manner by executing a website program. Furthermore, the server 300 includes a function of performing management and collation of the performer information of the performer who delivers the performance. In the present preferred embodiment, the performer needs to operate the mobile terminal 500 to register the performer information in advance.

For example, in the case of receiving a moving image content from the photographing apparatus 200, the server 300 manages the received moving image content per channel unit established for distribution on a moving image sharing website provided by the server 300. Furthermore, based on an access request from a viewer who views the moving image sharing website on the content display device 400, the server 300 distributes the moving image content according to a viewing environment of the viewer. In addition, the server 300 performs a processing that associates information related to a tip given by the viewer for the performer during a period from a start to an end of the performance delivered by the performer (hereinafter, referred to as "tip information") with the performer information of the performer.

The content display device 400 includes a function of connecting to the Internet by using a wireless communication method or a wired communication method and transmitting and receiving data. For example, in the case of receiving the moving image content from the server 300, the content display device 400 executes a dedicated application program. As a result, the received moving image content is displayed and outputted on a web browser running on the content display device 400. In the moving image content displayed and outputted on the content display device 400, the viewer is able to give the tip to the performer delivering the performance in the moving image content. It should be noted that, in the present preferred embodiment, a personal computer (hereinafter, referred to as "a PC"), a smartphone, a tablet terminal, or the like is used as the content display device 400, but the content display device 400 is not limited thereto. The content display device 400 may be another device having the same functions as the PC, the smartphone, the tablet terminal, or the like. Furthermore, in the present preferred embodiment, for ease of the description, a configuration in which the content distribution system 100 includes one content display device 400 is described as an example, but the content distribution system 100 is not limited to this configuration. A configuration, in which a situation is assumed in which a plurality of users views the moving image content by using the different content display devices 400 and the content distribution system 100 includes the plurality of content display devices 400, may be used.

The mobile terminal 500 is a terminal possessed (carried) by the performer who delivers the performance. The mobile terminal 500 includes a function of connecting to the Internet by using a wireless communication method or a wired communication method and transmitting and receiving data. For example, the mobile terminal 500 transmits the performer information of the performer who possesses the mobile terminal 500 to the server 300. In addition, the mobile terminal 500 receives the tip information associated with the performer information of the performer based on the tip given by the viewer of the moving image content. Further, the mobile terminal 500 displays and outputs the performer information and the tip information on a monitor, a panel, or the like of the mobile terminal 500. It should be noted that, in the present preferred embodiment, a smartphone is used as the mobile terminal 500, but the mobile terminal 500 is not limited to the smartphone and may be another device having the same functions as the smartphone, such as a tablet terminal or a PC.

Figure 2:
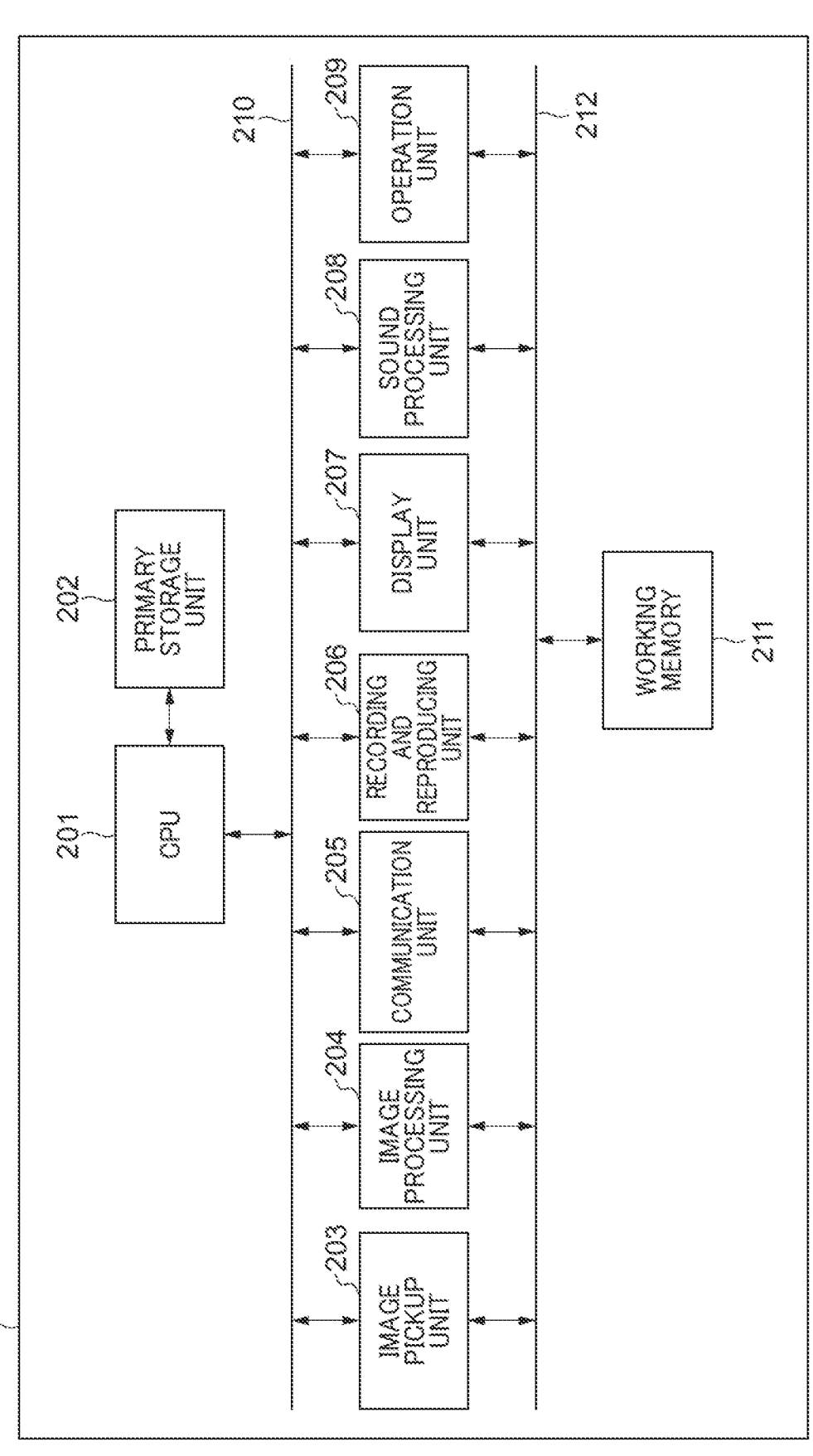
FIG. 2 is a block diagram that shows an example of a hardware configuration of a photographing apparatus shown in FIG. 1.

FIG. 2 is a block diagram that shows an example of a hardware configuration of the photographing apparatus 200 shown in FIG. 1.

As shown in FIG. 2, the photographing apparatus 200 includes a central processing unit (CPU) 201, a primary storage unit 202, an image pickup unit 203, an image processing unit 204, a communication unit 205, a recording and reproducing unit 206, a display unit 207, a sound processing unit 208, an operation unit 209, and a working memory 211.

The CPU 201, the image pickup unit 203, the image processing unit 204, the communication unit 205, the recording and reproducing unit 206, the display unit 207, the sound processing unit 208, and the operation unit 209 are connected to each other via a CPU bus 210. In addition, the image pickup unit 203, the image processing unit 204, the communication unit 205, the recording and reproducing unit 206, the display unit 207, the sound processing unit 208, the operation unit 209, and the working memory 211 are connected to each other via a memory bus 212.

The CPU 201 controls various kinds of operations of the photographing apparatus 200 by loading and executing control programs stored in the primary storage unit 202, the working memory 211, and the recording and reproducing unit 206. For example, the CPU 201 performs control of the start, the stop, etc. of the image pickup unit 203, the image processing unit 204, the communication unit 205, the recording and reproducing unit 206, the display unit 207, the sound processing unit 208, and the operation unit 209 that are connected via the CPU bus 210.

The primary storage unit 202 is a storage area used as a working area or the like of the CPU 201. The primary storage unit 202 may be, for example, a dynamic random access memory (DRAM), a static random access memory (SRAM), or a nonvolatile flash memory. For example, the CPU 201 realizes various kinds of functions provided by the photographing apparatus 200 by executing the control program stored in the primary storage unit 202.

The image pickup unit 203 includes an optical unit (not shown) such as a lens and a camera unit (not shown) including an image pickup device such as a charge coupled device (CCD) image pickup device. The image pickup unit 203 converts optical signals obtained from the lens into electrical signals by means of the image pickup device and then outputs the electrical signals to the image processing unit 204 as raw image data converted into the Bayer format.

The image processing unit 204 executes a demosaic processing that converts the raw image data outputted from the image pickup unit 203 into signals including a luminance and a color difference. Furthermore, the image processing unit 204 performs a development processing. The development processing is a processing that removes noises included in each converted signal, corrects an optical distortion, and optimizes an image. The image processing unit 204 compresses and encodes the image data subjected to the development processing based on a standardization standard such as JPEG, H. 264, or HEVC and outputs the compressed image data to the working memory 211.

Furthermore, in the case of acquiring compressed data from the recording and reproducing unit 206, the image processing unit 204 performs a decompression processing with respect to the compressed data. As a result, the compressed data is restored to the image data. In addition, in the case that the communication unit 205 receives compressed data from an external apparatus and the compressed data is stored in the working memory 211, the image processing unit 204 acquires the compressed data from the working memory 211 and performs a decoding and decompression processing with respect to the compressed data. As a result, the compressed data is restored to the image data. It should be noted that, in the present preferred embodiment, it is assumed that the image processing unit 204 is realized by dedicated hardware such as a digital signal processor (DSP) or by wiring logic and performs high-speed real-time processing, but the image processing unit 204 is not limited to this configuration. The image processing unit 204 may have any another configuration as long as it can realize equivalent functions and equivalent performance that are realized by the software processing of the CPU 201.

The communication unit 205 is an interface for the photographing apparatus 200 to communicate with the external apparatus. The communication unit 205 includes a wireless communication interface or a wired communication interface. The wireless communication interface is an interface conforming to a communication standard of public wireless communication such as LTE or 5G or a wireless local area network (LAN) such as Wi-Fi. The wired communication interface is an interface conforming to a standard such as a LAN using an optical fiber cable or a coaxial cable or a wide area network (WAN). It should be noted that, in the present preferred embodiment, the communication unit 205 may be configured to be connected to the external apparatus via the Internet so as to be able to communicate the moving image content, etc. with the external apparatus. That is, the communication performed by the communication unit 205 with the external apparatus may be wireless communication or may be wired communication. Furthermore, the communication unit 205 may include a plurality of communication interfaces corresponding to respective communication standards as a configuration capable of supporting a plurality of communication standards.

The recording and reproducing unit 206 performs writing and reading of data and programs. The recording and reproducing unit 206 may be realized by, for example, a non-volatile memory such as a hard disk drive or a flash memory. In addition, another configuration of the recording and reproducing unit 206 may be a configuration of acquiring the data and the programs from an external recording device such as a USB recording device, an SD card, a DVD-RW, a CD-ROM, a CD-R, or a DVD-RAM. It should be noted that, in the present preferred embodiment, it is assumed that the recording and reproducing unit 206 is used as a secondary storage area for storing or reproducing the image data temporarily stored in the working memory 211, but the recording and reproducing unit 206 is not limited to be used as the secondary storage area. For example, the recording and reproducing unit 206 may be used as an area that records the programs executed by the CPU 201 and the data.

The display unit 207 displays and outputs graphics data such as characters and menu icons that are generated by the CPU 201, the image data developed by the image processing unit 204, etc. on a display monitor device such as an organic electro-luminescence (EL) display or a liquid crystal display (LCD). It should be noted that, in the present preferred embodiment, the photographing apparatus 200 may not include the display unit 207. For example, the photographing apparatus 200 may be configured to transmit the graphics data to the server 300 connected via a network and cause a display unit 306 of the server 300 to display and output the graphics data.

The sound processing unit 208 performs a digital-to-analog conversion or an analog-to-digital conversion with respect to a sound (voice) of the performer collected by using a sound input/output device of the photographing apparatus 200, a sound effect set in advance in the photographing apparatus 200, or the like and inputs and outputs the conversion result obtained by the digital-to-analog conversion or the analog-to-digital conversion. The sound input/output device may be, for example, a microphone and a speaker that are built in the photographing apparatus 200. Furthermore, the sound input/output device may be a headphone, an earphone or a microphone, and a speaker that are physically connected to audio terminals of the photographing apparatus 200 or wirelessly connected by a wireless interface such as Bluetooth.

The operation unit 209 includes an operation means that includes one or more operation members for the user to input an instruction. For example, the operation unit 209 accepts a setting instruction of an operation mode of the photographing apparatus 200 by a pointing device such as a button or a switch. In addition, the operation unit 209 realizes an input user interface function by detecting a position at which the user touches a touch panel integrated with the display unit 207.

The CPU bus 210 is a control bus that connects the CPU 201, the image pickup unit 203, the image processing unit 204, the communication unit 205, the recording and reproducing unit 206, the display unit 207, the sound processing unit 208, and the operation unit 209. It should be noted that, as a bus transfer system of the CPU bus 210, a standardized bus standard system similar to that of the memory bus 212 may be adopted, or a serial system such as a low-speed I2C may be adopted.

Similarly to the primary storage unit 202, the working memory 211 may be, for example, a DRAM or an SRAM. The working memory 211 is used as a working area for temporarily storing data. For example, the working memory 211 stores the raw image data outputted by the image pickup unit 203, the image data inputted and outputted by the image processing unit 204, and the data received by the communication unit 205 from the external apparatus. In addition, the working memory 211 stores menu and character data to be superimposed on the image data and to be outputted on the display unit 207, and sound data processed by the sound processing unit 208.

The memory bus 212 is a data bus for connecting the image pickup unit 203, the image processing unit 204, the communication unit 205, the recording and reproducing unit 206, the display unit 207, the sound processing unit 208, the operation unit 209, and the working memory 211. The image data and various kinds of parameters are transferred at high speed via the memory bus 212. It should be noted that, as a bus transfer system of the memory bus 212, a standardized bus standard system such as ISA, PCI-Express, or AXI may be adopted, or a unique bus system may be adopted.

Figure 3:
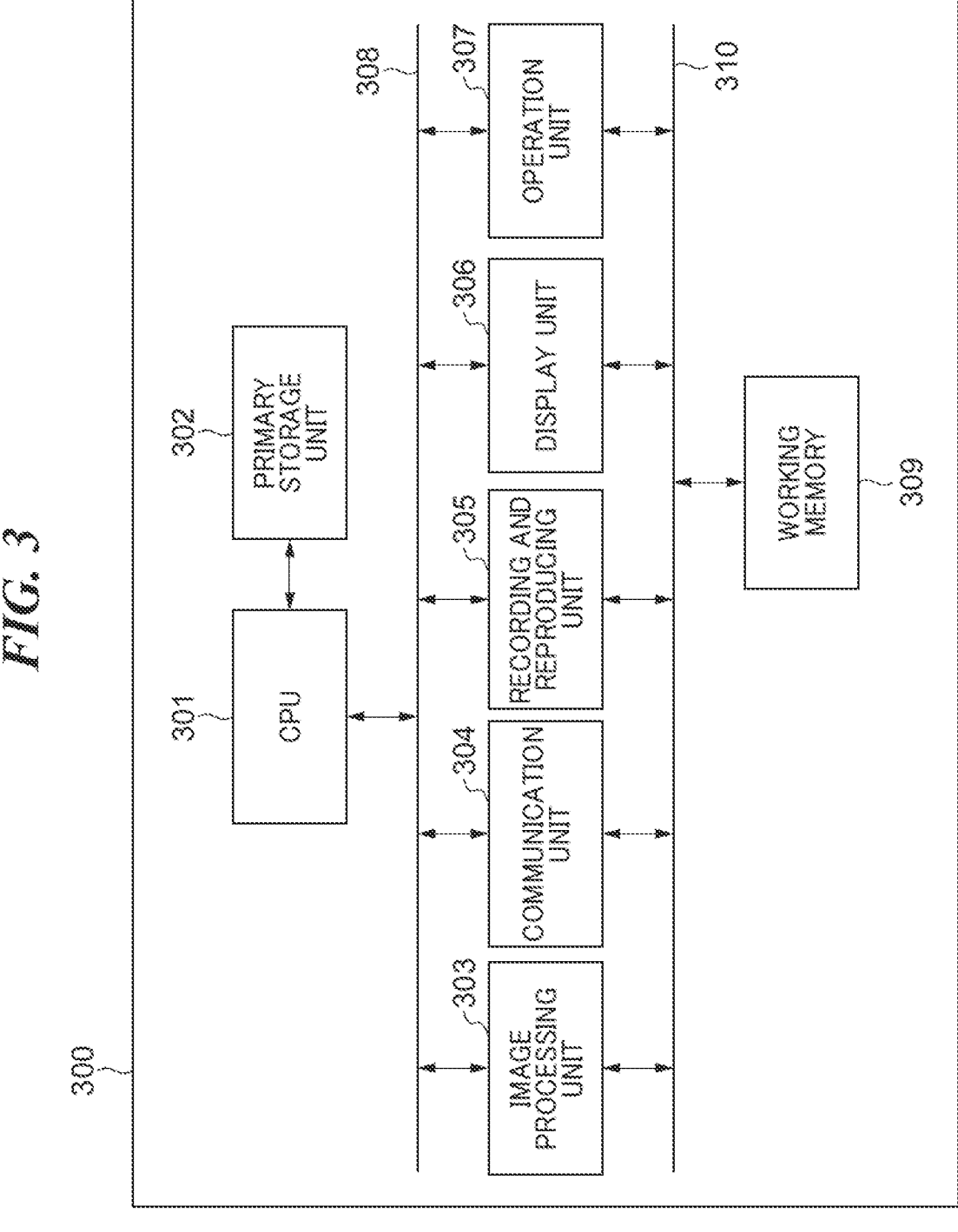
FIG. 3 is a block diagram that shows an example of a hardware configuration of a server shown in FIG. 1.

FIG. 3 is a block diagram that shows an example of a hardware configuration of the server 300 shown in FIG. 1.

As shown in FIG. 3, the server 300 includes a CPU 301, a primary storage unit 302, an image processing unit 303, a communication unit 304, a recording and reproducing unit 305, the display unit 306, an operation unit 307, and a working memory 309. The CPU 301, the image processing unit 303, the communication unit 304, the recording and reproducing unit 305, the display unit 306, and the operation unit 307 are connected to each other via a CPU bus 308. In addition, the image processing unit 303, the communication unit 304, the recording and reproducing unit 305, the display unit 306, the operation unit 307, and the working memory 309 are connected to each other via a memory bus 310.

The CPU 301 controls various kinds of operations of the server 300 by loading and executing control programs stored in the primary storage unit 302, the working memory 309, and the recording and reproducing unit 305. For example, the CPU 301 performs control of the start, the stop, etc. of the image processing unit 303, the communication unit 304, the recording and reproducing unit 305, the display unit 306, and the operation unit 307 that are connected via the CPU bus 308.

The primary storage unit 302 is a storage area used as a working area or the like of the CPU 301. The primary storage unit 302 may be, for example, a DRAM, an SRAM, or the like. The image processing unit 303 performs a decoding processing of the moving image content received by the communication unit 304 from the photographing apparatus 200. In addition, the image processing unit 303 performs a combination processing that combines a graphical user interface (GUI) for the viewer to give an instruction of tipping (hereinafter, referred to as "a tipping GUI") with the moving image content. Furthermore, the image processing unit 303 performs a compression processing with respect to the moving image content distributed to the content display device 400 so as to obtain an optimum image size and an optimum frame rate. In addition, the image processing unit 303 generates graphics data to be individually displayed and outputted on the mobile terminal 500 and the content display device 400, for example, generates data for displaying and outputting the tip information.

The communication unit 304 is an interface for the server 300 to communicate with the external apparatus. The server 300 transmits and receives various kinds of data to and from the external apparatus via the network by means of the communication unit 304.

The recording and reproducing unit 305 performs writing and reading of data and programs. The recording and reproducing unit 305 may be realized by, for example, a non-volatile memory such as a hard disk drive or a solid state drive (SSD). In addition, another configuration of the recording and reproducing unit 305 may be a configuration of acquiring the data and the programs from an optical disk such as a DVD-RW, a CD-ROM, a CD-R, or a DVD-RAM.

The display unit 306 is an output interface that presents various types of information to a user with an administrator authority who operates the server 300, and is realized by a display device such as an LCD. It should be noted that the server 300 may not necessarily include the display unit 306 as long as the server 300 includes a means that displays information of the server 300 on another device by remote desktop connection via the communication unit 304, or the like.

The operation unit 307 is an input interface that accepts an instruction from the user with the administrator authority of the server 300, and is realized, for example, by a keyboard, a pointing device, and a touch panel. It should be noted that the server 300 may not necessarily include the operation unit 307 as long as the server 300 includes an input interface means capable of controlling the server 300 from another device by the remote desktop connection via the communication unit 304. The CPU bus 308 has the same functions and the same configuration as the CPU bus 210 of the photographing apparatus 200 described above.

Similarly to the primary storage unit 302, the working memory 309 may be, for example, a DRAM or an SRAM. The working memory 309 is used as a working area for temporarily storing data. For example, the working memory 309 stores the image data inputted and outputted by the image processing unit 303, the data received by the communication unit 304 from the external apparatus, data displayed and outputted on the display unit 306, etc. The memory bus 310 has the same functions and the same configuration as the memory bus 212 of the photographing apparatus 200 described above.

It should be noted that, in the present preferred embodiment, a hardware configuration of the content display device 400 and a hardware configuration of the mobile terminal 500 are similar to the hardware configuration of the server 300. However, as long as the functions that become the features of the present invention can be realized, the hardware configuration of the content display device 400 and the hardware configuration of the mobile terminal 500 do not necessarily have to be the same as the hardware configuration of the server 300, and may be another configuration.

Next, the distribution of the content in the content distribution system 100 will be described. In the present preferred embodiment, as an example, a case that the photographing apparatus 200 photographs a plurality of performers playing a street piano by turns to generate a moving image content and the moving image content is distributed in real time is described. It should be noted that, in the present preferred embodiment, as an example of the content, the configuration of distributing the moving image content including the video and the sound is described, but the content is not limited to the moving image content. For example, in the present invention, a configuration of distributing a content only including a video or a configuration of distributing a content only including a sound may be used.

Figure 4:
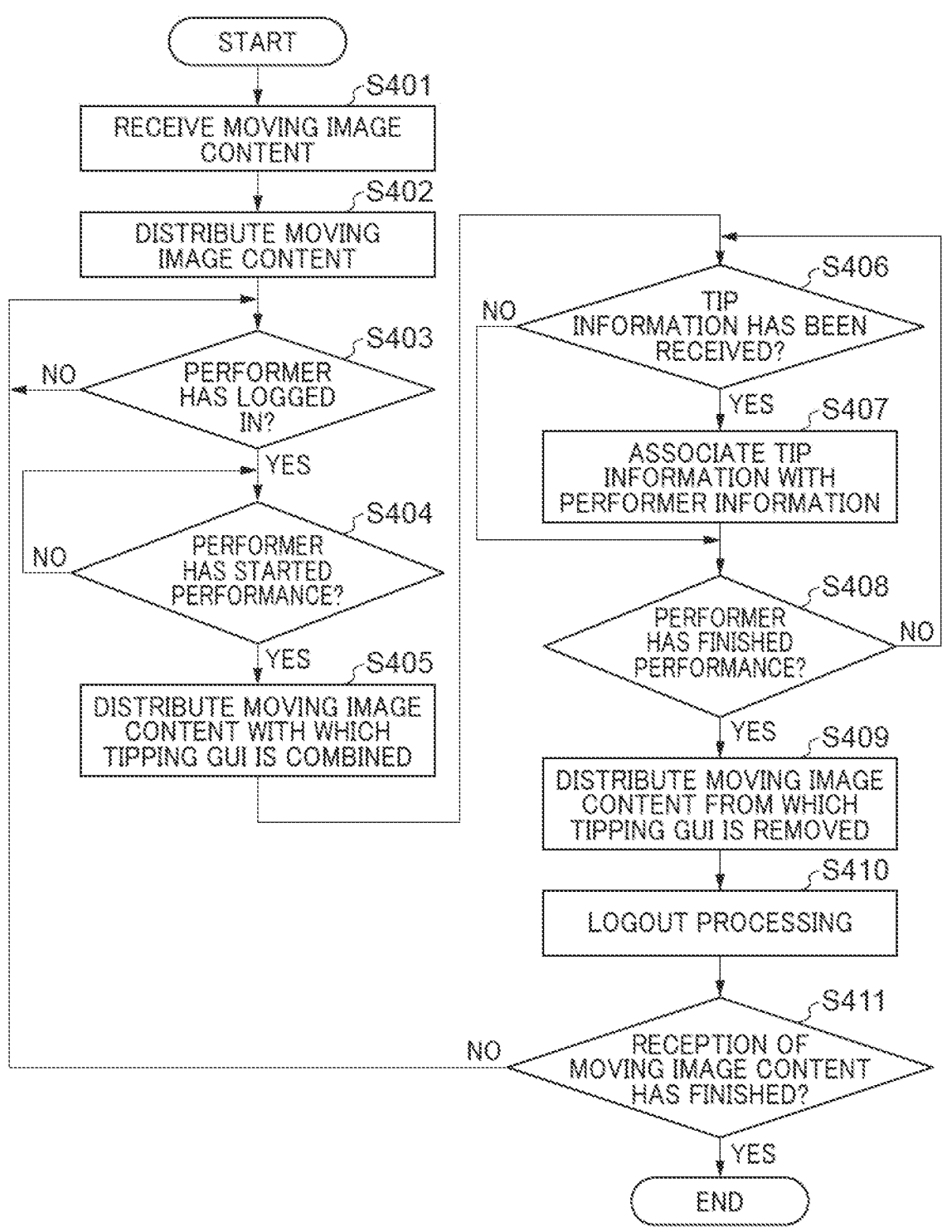
FIG. 4 is a flowchart that shows a procedure of a content distribution control processing executed in the server shown in FIG. 1.

FIG. 4 is a flowchart that shows a procedure of a content distribution control processing executed in the server 300 shown in FIG. 1. The content distribution control processing of FIG. 4 is realized by the CPU 301 executing the control programs stored in the primary storage unit 302, the working memory 309, and the recording and reproducing unit 305.

As shown in FIG. 4, first, the CPU 301 receives the moving image content from the photographing apparatus 200 (a step S401). Next, the CPU 301 distributes the received moving image content on the network (a step S402). In the step S402, for example, the moving image content is distributed to the content display device 400 according to the access request from the viewer who views the moving image sharing website provided by the server 300 on the content display device 400.

Figure 5:
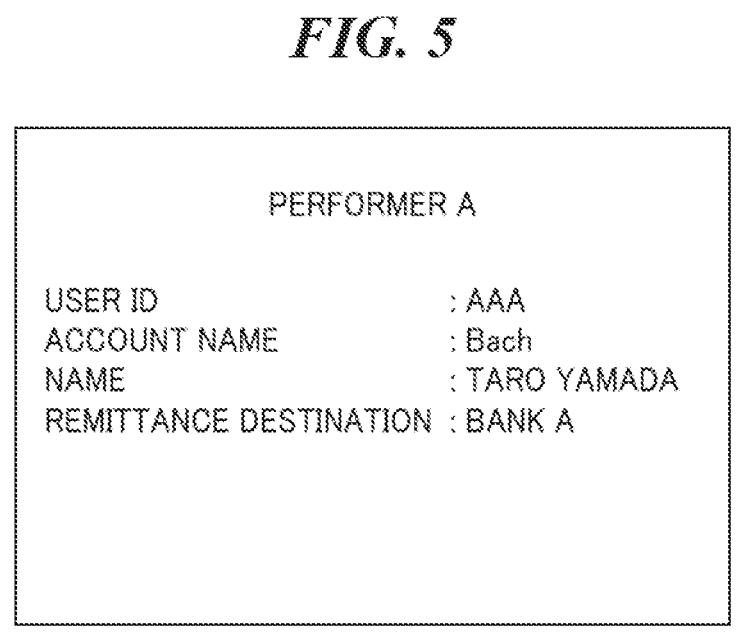

Next, the CPU 301 determines whether or not the performer who starts the performance in the moving image content has logged in (a step S403). It should be noted that a login processing by the performer will be described below with reference to FIG. 6. In the present preferred embodiment, when the performer who starts the performance in the moving image content logs in, performer information of the performer who starts the performance in the moving image content is associated with a distribution channel that distributes the moving image content. For example, as shown in FIG. 5, the performer information includes a user ID of the performer, an account name of the performer, a name of the performer, and remittance destination information indicating a remittance destination of the tip. By associating the performer information with the distribution channel, the viewer of the moving image content is able to give the tip to the performer while the performer delivers the performance.

The CPU 301 stands by until the performer who starts the performance in the moving image content logs in. When the performer logs in (YES in the step S403), the CPU 301 executes a performance start detection processing of FIG. 7A described below. The CPU 301 determines whether or not the performer has started the performance (a step S404).

When the performer starts the performance (YES in the step S404), the content distribution control processing proceeds to a step S405. It should be noted that, in the step S404, in the case that detection of timeout is performed by a timer or the like and the performance is not started even after a predetermined period of time has elapsed, the content distribution control processing proceeds to a step S410 described below.

In the step S405, the CPU 301 distributes the moving image content, with which the tipping GUI is combined, on the network. For example, the moving image content is distributed to the content display device 400, and the moving image content is displayed and outputted on the content display device 400. When the viewer inputs an instruction of giving a tip to the performer who is in performance in the moving image content to the content display device 400, the tip information including the amount of money or the like designated as the tip is transmitted from the content display device 400 to the server 300.

Next, the CPU 301 determines whether or not the tip information has been received (a step S406). In the case of being determined in the step S406 that the tip information has not been received, the content distribution control processing proceeds to a step S408 described below. On the other hand, in the case of being determined in the step S406 that the tip information has been received, the content distribution control processing proceeds to a step S407.

In the step S407, the CPU 301 performs a processing that associates the tip information with the performer information of the performer who has logged in, that is, the performer information of the performer delivering the performance. Next, the CPU 301 performs a performance end detection processing of FIG. 7B described below. The CPU 301 determines whether or not the performer has finished the performance (the step S408).

In the case of being determined in the step S408 that the performer has not finished the performance, the content distribution control processing returns to the step S406. On the other hand, in the case of being determined in the step S408 that the performer has finished the performance, the content distribution control processing proceeds to a step S409.

In the step S409, the CPU 301 distributes the moving image content, from which the tipping GUI is removed. Next, the CPU 301 performs a logout processing of the performer who has finished the performance (the step S410). As a result, the association of the performer information with the distribution channel is canceled (released).

Next, the CPU 301 determines whether or not the reception of the moving image content from the photographing apparatus 200 has finished (a step S411). For example, when the power of the photographing apparatus 200 is turned off, an image pickup processing performed by the photographing apparatus 200 is finished, or the communication between the photographing apparatus 200 and the server 300 is cut off, it is determined that the reception of the moving image content from the photographing apparatus 200 has finished. In the case of being determined in the step S411 that the reception of the moving image content from the photographing apparatus 200 has finished, the content distribution control processing ends. On the other hand, in the case of being determined in the step S411 that the reception of the moving image content from the photographing apparatus 200 has not finished, the content distribution control processing returns to the step S403.

It should be noted that the CPU 301 may measure an elapsed time from a time point at which it is determined in the step S404 that the performer has started the performance. Then, when it is determined in the step S408 that the performer has not finished the performance, the CPU 301 may further compare the elapsed time from the start of the performance with a preset time, and when the elapsed time exceeds the preset time, the CPU 301 may advance the content distribution control processing to the step S409. As a result, it is possible to set an upper limit to the time of performance of one performer to prevent occupancy, and thus it becomes possible to distribute moving image contents of performances of more performers.

Figure 6:
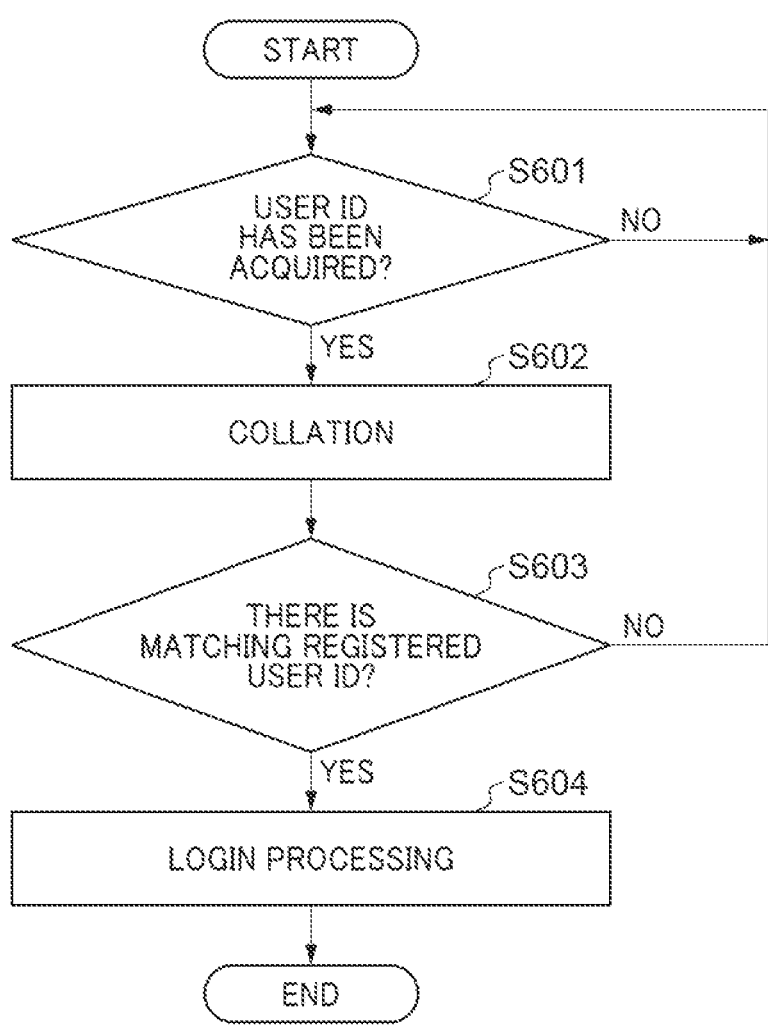
FIG. 6 is a flowchart that shows a procedure of a login control processing executed in the server shown in FIG. 1.

FIG. 6 is a flowchart that shows a procedure of a login control processing executed in the server 300 shown in FIG. 1. The login control processing of FIG. 6 is realized by CPU 301 executing the control programs stored in the primary storage unit 302, the working memory 309, and the recording and reproducing unit 305. The login control processing of FIG. 6 is executed when the performer directs the display unit of the mobile terminal 500 to the photographing apparatus 200. A QR code including the user ID of the performer is displayed on the display unit of the mobile terminal 500.

As shown in FIG. 6, the CPU 301 determines whether or not the user ID of the performer has been acquired (a step S601). In the step S601, for example, the CPU 301 controls the image processing unit 303 to read the QR code displayed on the display unit of the mobile terminal 500 from the moving image content and acquires the user ID included in the QR code. It should be noted that the method for acquiring the user ID is not limited to this method. For example, a configuration, in which the photographing apparatus 200 that has photographed the QR code displayed on the display unit of the mobile terminal 500 reads the QR code, acquires the user ID included in the QR code, and transmits the acquired user ID to the server 300, may be adopted.

When the user ID of the performer is acquired (YES in step S601), the CPU 301 collates the acquired user ID with a plurality of user IDs registered in advance (hereinafter, the plurality of user IDs registered in advance is referred to as "registered user IDs") (a step S602). Next, the CPU 301 determines whether or not the registered user ID that matches the acquired user ID has been detected (a step S603).

In the step S603, in the case that the registered user ID that matches the acquired user ID has not been detected, the login control processing returns to the step S601. On the other hand, in the step S603, in the case that the registered user ID that matches the acquired user ID has been detected, the login control processing proceeds to a step S604. In the step S604, the CPU 301 performs the login processing of the performer corresponding to the user ID. As a result, the performer information of the performer is associated with the distribution channel that distributes the moving image content, and the viewer of the moving image content becomes able to give the tip to the performer while the performer delivers the performance. Thereafter, the login control processing ends.

Figure 7A:
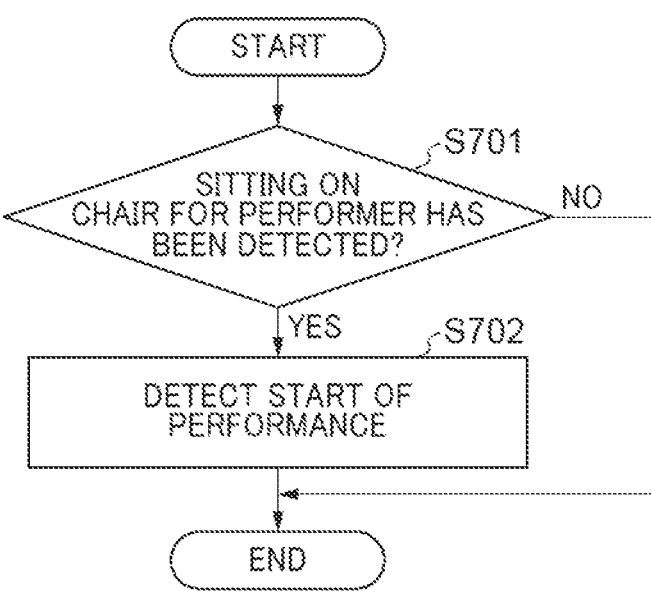
FIG. 7A is a flowchart that shows a procedure of a performance start detection processing executed in the server shown in FIG. 1.

FIG. 7A is a flowchart that shows a procedure of the performance start detection processing executed in the server 300 shown in FIG. 1.

As shown in FIG. 7A, the CPU 301 determines whether or not it has been detected that the performer is seated in a chair for performer installed near the street piano (a step S701). In the step S701, for example, the CPU 301 controls the image processing unit 303 to perform an image analysis with respect to the moving image content received from the photographing apparatus 200, thereby detecting that the performer is seated in the chair for performer. Alternatively, a sensor, which is capable of detecting whether the performer is seated in the chair for performer or the performer has left the chair for performer based on weight or the like, is installed on the chair for performer, and the CPU 301 detects that the performer is seated in the chair for performer by receiving a signal, which indicates that the performer is seated in the chair for performer, from the sensor.

In the case of being determined in the step S701 that it has not been detected that the performer is seated in the chair for performer, the performance start detection processing ends. On the other hand, in the case of being determined in the step S701 that it has been detected that the performer is seated in the chair for performer, the CPU 301 detects a start of the performance by the performer (a step S702), and then the performance start detection processing ends.

Figure 7B:
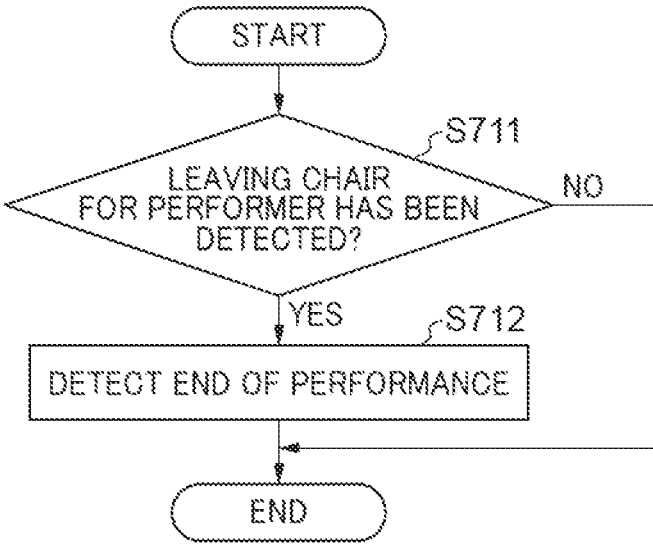
FIG. 7B is a flowchart that shows a procedure of a performance end detection processing executed in the server shown in FIG. 1.

FIG. 7B is a flowchart that shows a procedure of the performance end detection processing executed in the server 300 shown in FIG. 1.

As shown in FIG. 7B, the CPU 301 determines whether or not it has been detected that the performer has left the chair for performer (a step S711). In the step S711, for example, the CPU 301 controls the image processing unit 303 to perform the image analysis with respect to the moving image content received from the photographing apparatus 200, thereby detecting that the performer has left the chair for performer. Alternatively, the sensor, which is capable of detecting whether the performer is seated in the chair for performer or the performer has left the chair for performer based on weight or the like, is installed on the chair for performer, and the CPU 301 detects that the performer has left the chair for performer by receiving a signal, which indicates that the performer has left the chair for performer, from the sensor.

In the case of being determined in the step S711 that it has not been detected that the performer has left the chair for performer, the performance end detection processing ends. On the other hand, in the case of being determined in the step S711 that it has been detected that the performer has left the chair for performer, the CPU 301 detects an end of the performance by the performer (a step S712), and then the performance end detection processing ends.

Figure 8:
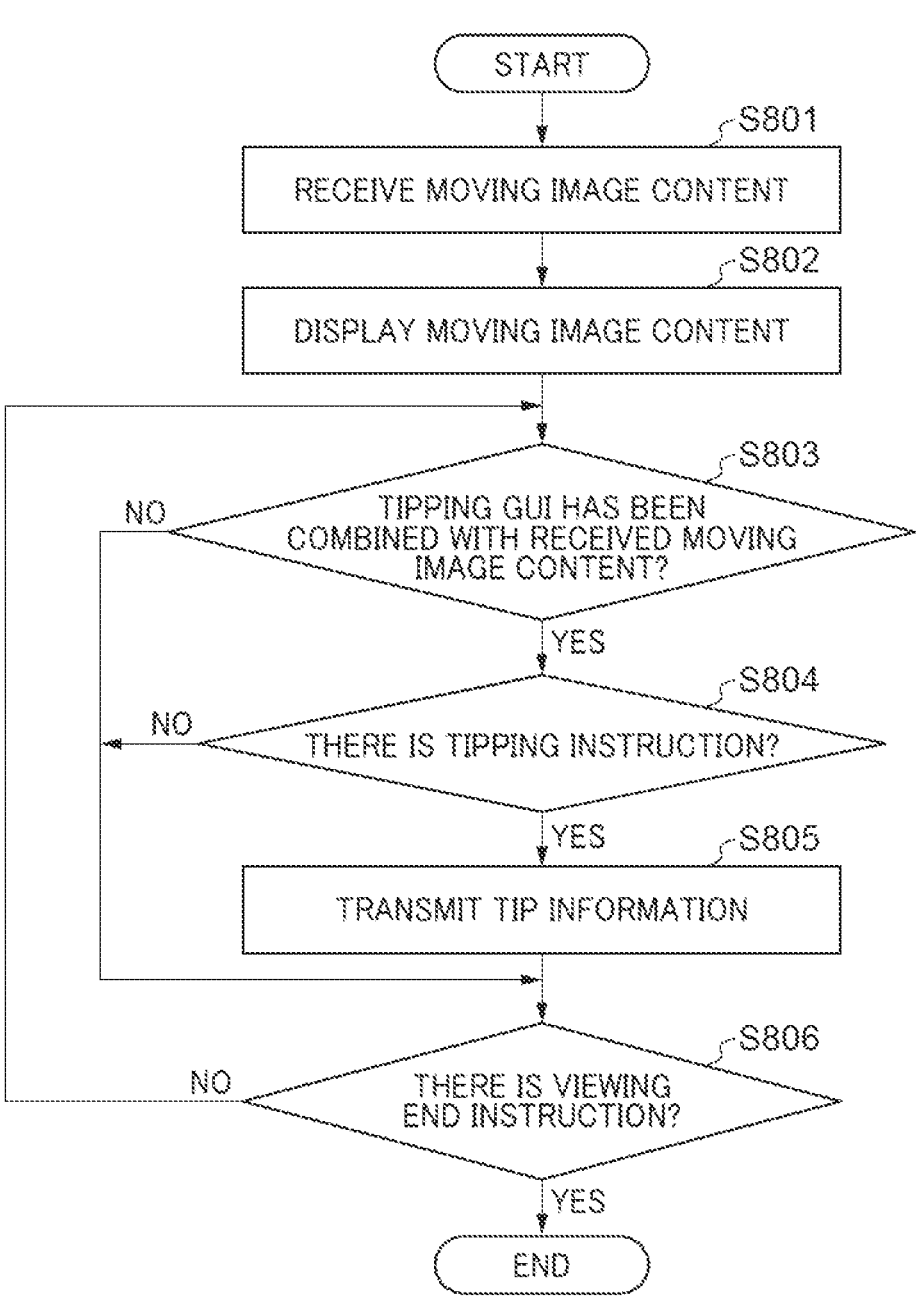
FIG. 8 is a flowchart that shows a procedure of a content display control processing executed in a content display device shown in FIG. 1.

FIG. 8 is a flowchart that shows a procedure of a content display control processing executed in the content display device 400 shown in FIG. 1. The content display control processing is realized by a CPU of the content display device 400 executing control programs stored in a primary storage unit, a working memory, and a recording and reproducing unit of the content display device 400.

Figures 9A, 9B:
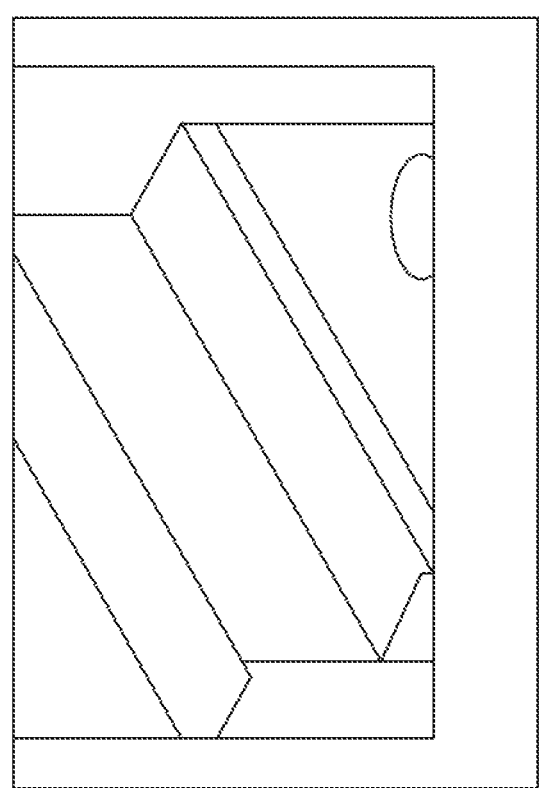
FIGS. 9A, 9B, 9C, and 9D are diagrams that show an example of a video displayed on the content display device shown in FIG. 1.
Figure 9D:
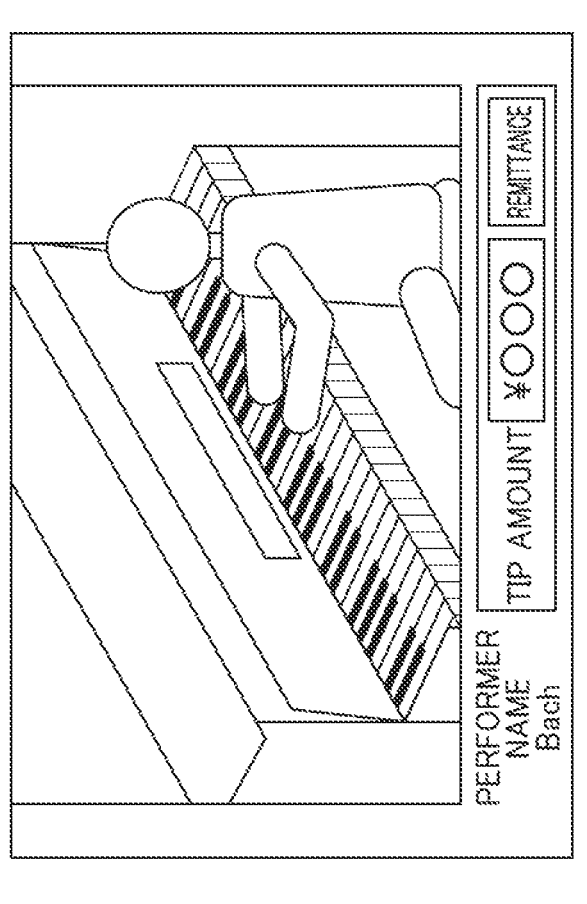
Figure 9C:
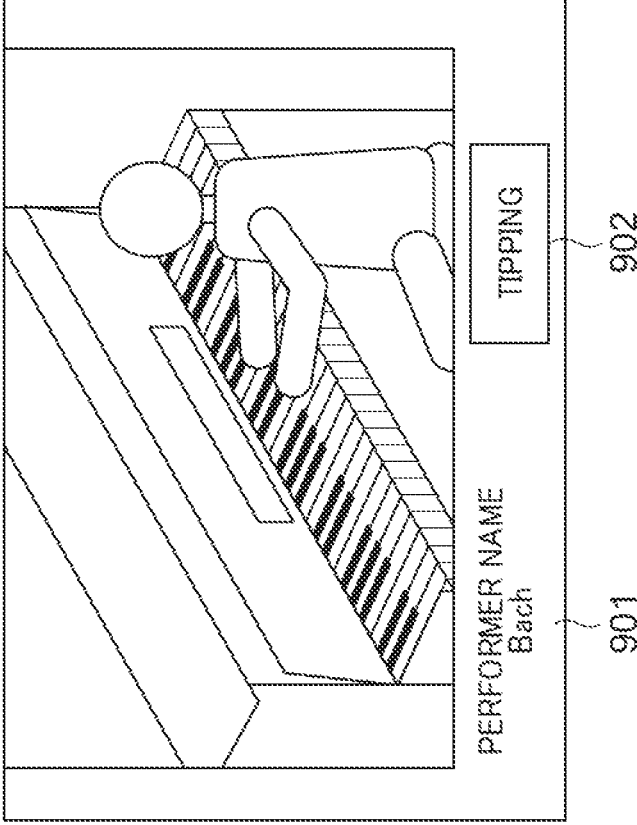

As shown in FIG. 8, the CPU of the content display device 400 receives the moving image content from the server 300 via a communication unit of the content display device 400 (a step S801). Next, the CPU of the content display device 400 displays the received moving image content on a display unit of the content display device 400 (a step S802). For example, in the case that the performer who delivers the performance has not yet logged in, as shown in FIG. 9A, a video photographed by the photographing apparatus 200 is displayed on the display unit of the content display device 400. In addition, in the case that the performer who delivers the performance has logged in, as shown in FIG. 9B, an account name 901 of the performer who has logged in is displayed on the display unit of the content display device 400 together with the video photographed by the photographing apparatus 200. Furthermore, in the case that the received moving image content is a moving image content with which the tipping GUI is combined, as shown in FIG. 9C, a tipping icon 902, which is the tipping GUI, is further displayed on the display unit of the content display device 400. When the viewer selects the tipping icon 902, as shown in FIG. 9D, it becomes possible to designate the amount of money of the tip.

Next, the CPU of the content display device 400 determines whether or not the tipping GUI has been combined with the received moving image content (a step S803). In the step S803, in the case that the tipping GUI has not been combined with the received moving image content, the content display control processing proceeds to a step S806 described below. On the other hand, in the step S803, in the case that the tipping GUI has been combined with the received moving image content, the content display control processing proceeds to a step S804.

In the step S804, the CPU of the content display device 400 determines whether or not an instruction of tipping has been received from the viewer of the moving image content. In the case of being determined in the step S804 that the instruction of tipping has not been received from the viewer of the moving image content, the content display control processing proceeds to the step S806 described below. On the other hand, in the case of being determined in the step S804 that the instruction of tipping has been received from the viewer of the moving image content, the content display control processing proceeds to a step S805. In the step S805, the CPU of the content display device 400 transmits the tip information corresponding to the instruction of tipping received from the viewer of the moving image content to the server 300. As described above, the tip information includes information indicating the amount of money designated as the tip by the viewer of the moving image content. It should be noted that the tip information may include other information such as a support comment for the performer in addition to the information indicating the amount of money. Next, the CPU of the content display device 400 determines whether or not a viewing end instruction of the moving image content has been received from the viewer (the step S806).

In the case of being determined in the step S806 that the viewing end instruction of the moving image content has not been received from the viewer, the content display control processing returns to the step S803. On the other hand, in the case of being determined in the step S806 that the viewing end instruction of the moving image content has been received from the viewer, the CPU of the content display device 400 ends the display of the moving image content and then ends the content display control processing.

In the present preferred embodiment, in this manner, the performer is able to confirm the tip information transmitted from the content display device 400 to the server 300 by using the mobile terminal 500.

Figure 10:
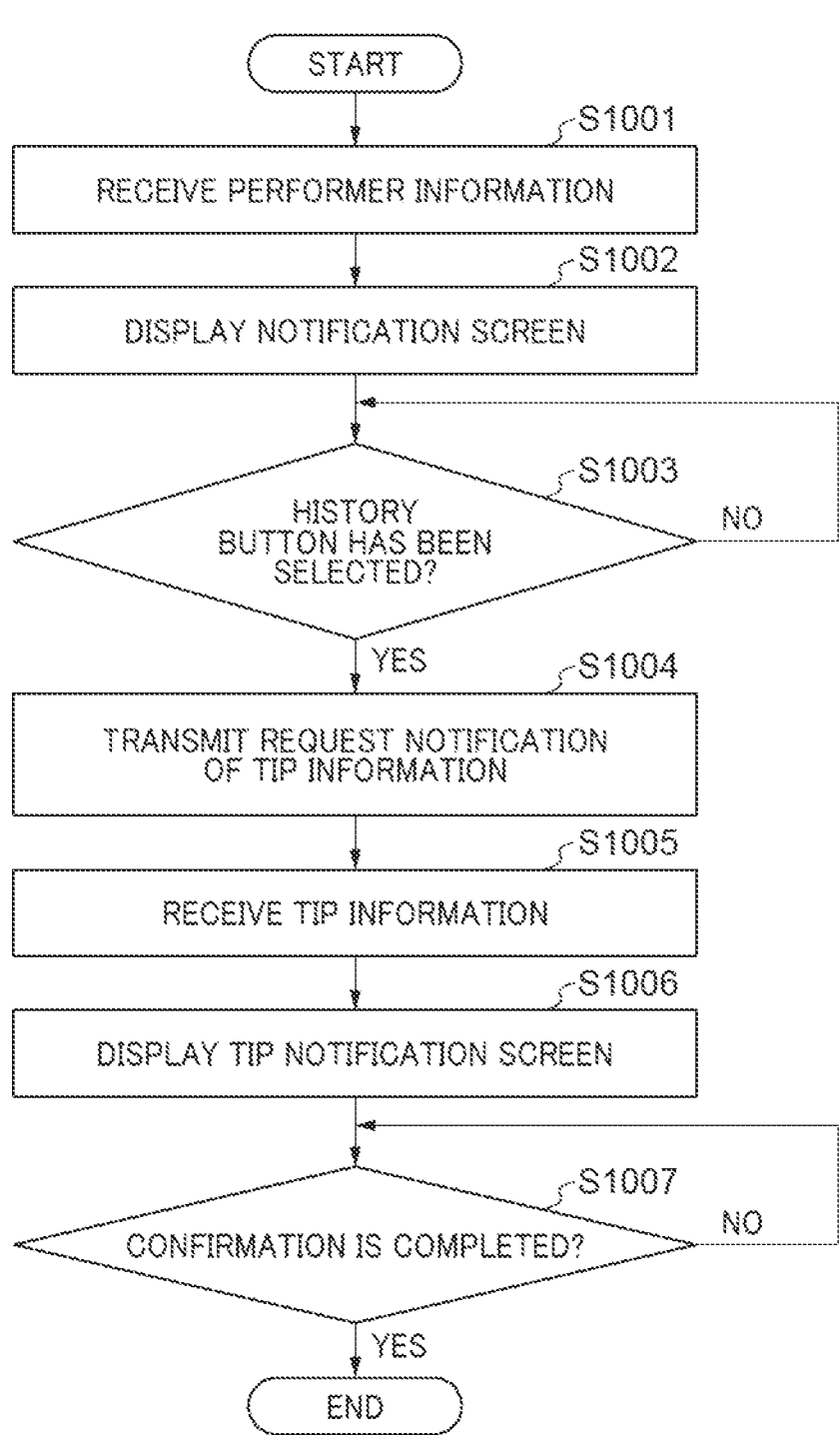
FIG. 10 is a flowchart that shows a procedure of a tip information notification processing executed in a mobile terminal shown in FIG. 1.

FIG. 10 is a flowchart that shows a procedure of a tip information notification processing executed in the mobile terminal 500 shown in FIG. 1. The tip information notification processing is realized by a CPU of the mobile terminal 500 executing control programs stored in a primary storage unit, a working memory, and a recording and reproducing unit of the mobile terminal 500. The tip information notification processing is executed when the performer issues an acquisition instruction of the performer information of the performer to the mobile terminal 500. The CPU of the mobile terminal 500 that has received the acquisition instruction controls a communication unit of the mobile terminal 500 to issue a transmission request of the performer information to the server 300. The server 300 that has received the transmission request of the performer information transmits the performer information to the mobile terminal 500.

Figure 11A:
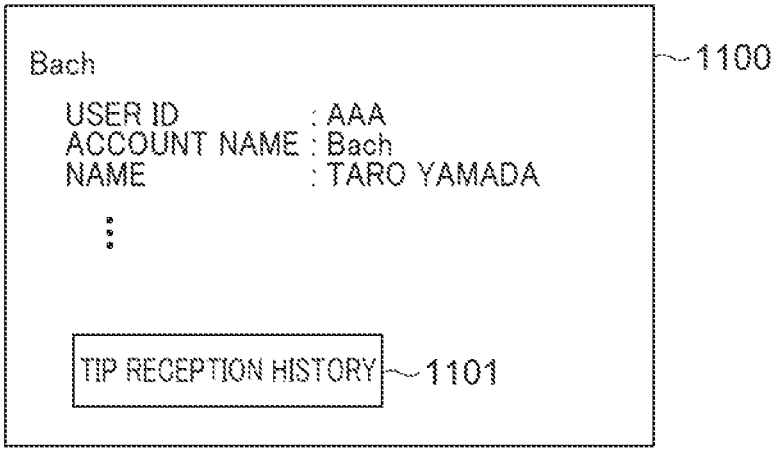
FIGS. 11A, 11B, and 11C are diagrams that show examples of a notification screen for confirming tip information.

As shown in FIG. 10, the CPU of the mobile terminal 500 receives the performer information from the server 300 by means of the communication unit of the mobile terminal 500 (a step S1001). Next, the CPU of the mobile terminal 500 displays a notification screen 1100 shown in FIG. 11A on a display unit of the mobile terminal 500 based on the received performer information (a step S1002). The user ID, the account name, and the user name (the name of the performer) that are included in the performer information are displayed on the notification screen 1100. In addition, a history button 1101 for issuing a transmission request of the tip information is displayed on the notification screen 1100. Next, the CPU of the mobile terminal 500 determines whether or not the performer has selected the history button 1101 on the notification screen 1100 (a step S1003). When the performer selects the history button 1101 (YES in the step S1003), the CPU of the mobile terminal 500 transmits a request notification of the tip information to the server 300 (a step S1004). The request notification of the tip information includes, for example, the performer information received from the server 300 in the step S1001. The server 300 transmits the tip information, which has been associated in the step S407 with the performer information included in the received request notification, to the mobile terminal 500.

Figure 11B:
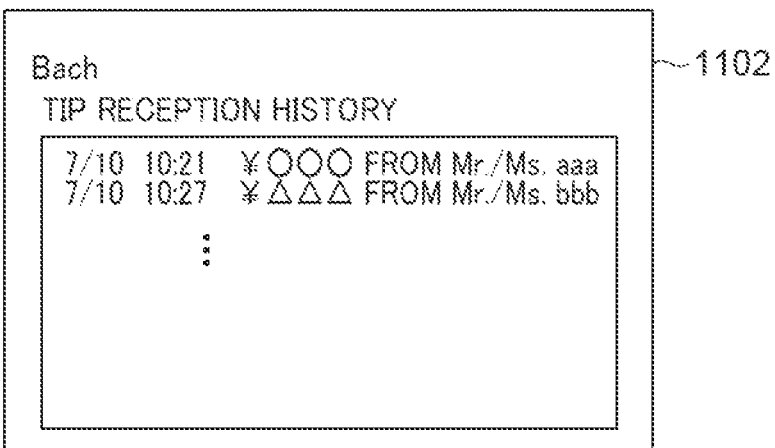

The CPU of the mobile terminal 500 receives the tip information from the server 300 by means of the communication unit of the mobile terminal 500 (a step S1005). Next, the CPU of the mobile terminal 500 displays a tip notification screen 1102 shown in FIG. 11B on the display unit of the mobile terminal 500 based on the received tip information (a step S1006). The CPU of the mobile terminal 500 determines whether or not the performer has completed confirmation of the tip information displayed on the tip notification screen 1102 (a step S1007). In the step S1007, for example, in the case that the performer performs a predetermined operation indicating that the confirmation has been completed, it is determined that the performer has completed the confirmation of the tip information displayed on the tip notification screen 1102. On the other hand, in the case that the performer does not perform the predetermined operation, it is determined that the performer has not completed the confirmation of the tip information displayed on the tip notification screen 1102. The CPU of the mobile terminal 500 continues the display of the tip notification screen 1102 until the performer completes the confirmation of the tip information displayed on the tip notification screen 1102. When the performer completes the confirmation of the tip information displayed on the tip notification screen 1102 (YES in the step S1007), the tip information notification processing ends.

As described above, according to the preferred embodiment described above, the login processing of the performer who starts the performance is performed. The start of the performance by the performer is detected, and the end of the performance by the performer is detected. The tip information corresponding to the tip received during the period from the start to the end of the performance delivered by the performer is associated with the performer information corresponding to the performer. As a result, the viewer is able to give the tip to each performer in the distribution of the moving image content generated by photographing the plurality of performers delivering performances by turns.

Furthermore, in the preferred embodiment described above, the login processing is performed based on the performer information corresponding to the performer, which is acquired by reading the QR code displayed on the display unit of the mobile terminal 500 possessed by the performer who starts the performance. As a result, it is possible to easily perform the login processing of the performer, which is required for controlling that the viewer give the tip to each performer, by using the QR code displayed on the display unit of the mobile terminal 500 possessed by the performer.

In the preferred embodiment described above, the start of the performance by the performer is detected by detecting that the performer who has logged in through the login processing is seated in the chair for performer. As a result, it is possible to detect the start of the performance by the performer without forcing the performer to perform a special setting operation for detecting the start of the performance.

In the preferred embodiment described above, the end of the performance by the performer is detected by detecting that the performer who has logged in through the login processing has left the chair for performer. As a result, it is possible to detect the end of the performance by the performer without forcing the performer to perform a special setting operation for detecting the end of the performance.

Figure 11C:
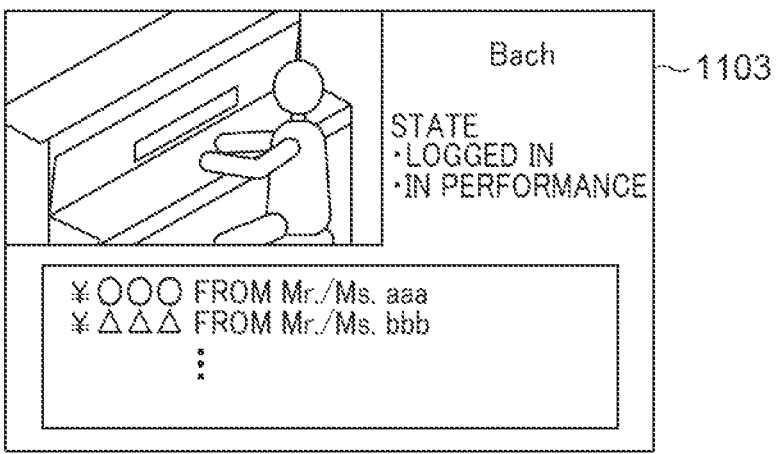

It should be noted that, in the preferred embodiment described above, the configuration, in which the performer confirms the tip information after the performer has finished the performance, has been described, but the present invention is not limited to this configuration. For example, during the performer is delivering the performance, a tip notification screen 1103 shown in FIG. 11C may be displayed on a display device for performer (not shown) installed at a position where the performer is able to view the display device for performer. In addition to the video in which the performer is delivering the performance, the tip information corresponding to the tip given to the performer is displayed on the tip notification screen 1103. As a result, the performer is able to know in real time that the tip has been given by the viewer.

In addition, in the preferred embodiment described above, the configuration, in which the login processing is performed by using the QR code, has been described, but the present invention is not limited to this configuration. For example, a configuration, in which the login processing is performed based on face authentication, may be adopted. In this configuration, face information of the performer is registered in the server 300 in advance as the performer information. For example, the server 300 performs a face detection processing with respect to the moving image content received from the photographing apparatus 200 by means of the image processing unit 303, and performs the face authentication by collating face information obtained by the face detection processing with the performer information managed by the server 300. In the case that the face authentication is successful, the server 300 performs the login processing of the performer. In this manner, by performing the login processing based on the face information detected in the moving image content, it is possible to perform the login processing of the performer even in the case that the performer does not possess (carry) a terminal for displaying the QR code such as the mobile terminal 500.

Furthermore, in the present preferred embodiment, a dedicated reader (not shown) for reading the performer information, which is separate from the photographing apparatus 200, may be installed in the facility where performer(s) deliver performance(s). The dedicated reader acquires the user ID from an IC card held up by the performer and transmits the acquired user ID to the server 300. The server

300 performs the login processing of the performer based on the acquired user ID. According to such a configuration, it is possible to perform the login processing of the performer without forcing the performer to perform an operation of displaying the QR code on the terminal such as the mobile terminal 500.

Furthermore, in the present preferred embodiment, regarding the detection of the start of the performance, it may be detected that the performer has started the performance when the performer logs in by any one of the methods described above.

Figure 12:
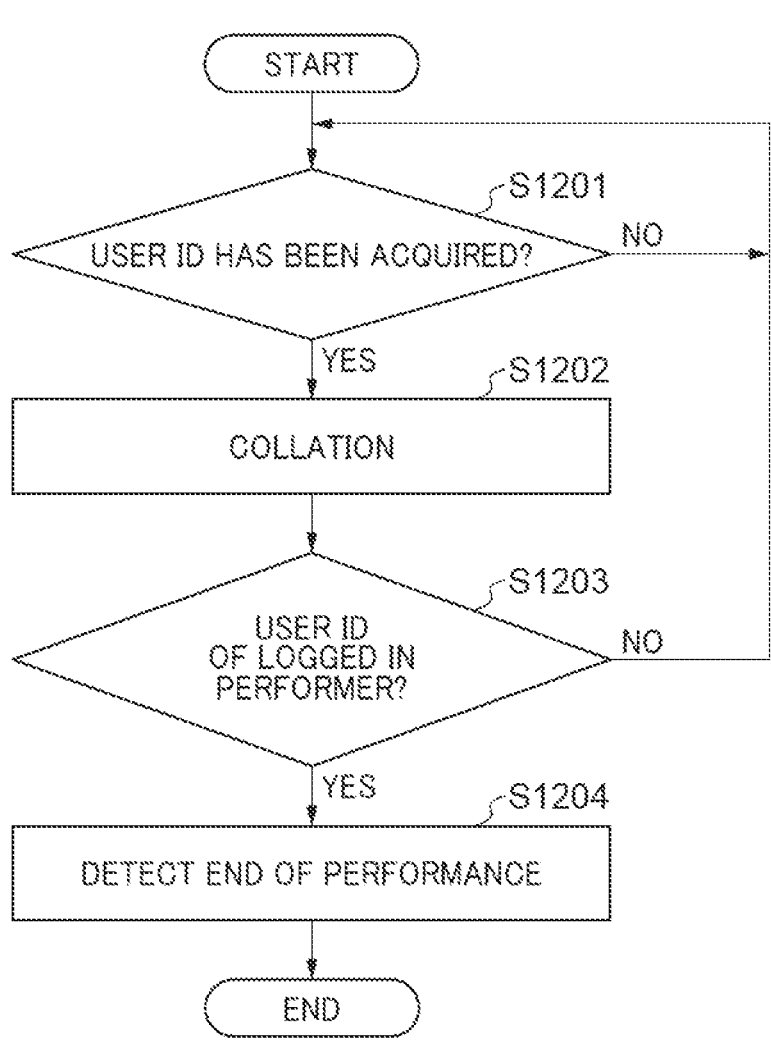
FIG. 12 is a flowchart that shows a procedure of another performance end detection processing executed in the server shown in FIG. 1.

Furthermore, in the present preferred embodiment, the detection of the end of the performance may be performed by another performance end detection processing shown in FIG. 12.

FIG. 12 is a flowchart that shows a procedure of the another performance end detection processing executed in the server 300 shown in FIG. 1. The another performance end detection processing of FIG. 12 is realized by the CPU 301 executing the control programs stored in the primary storage unit 302, the working memory 309, and the recording and reproducing unit 305. It should be noted that the another performance end detection processing of FIG. 12 is a processing similar to the performance end detection processing of FIG. 7B described above, and in particular, contents different from the performance end detection processing of FIG. 7B will be described below.

As shown in FIG. 12, the CPU 301 determines whether or not the user ID of the performer has been acquired from the QR code or the IC card described above (a step S1201). When the user ID of the performer is acquired from the QR code or the IC card described above (YES in the step S1201), the CPU 301 collates the acquired user ID with the plurality of registered user IDs registered in advance (a step S1202). Next, the CPU 301 determines whether or not the registered user ID that matches the acquired user ID is the user ID of the performer who has logged in (a step S1203).

In the case of being determined in the step S1203 that the registered user ID that matches the acquired user ID is not the user ID of the performer who has logged in, the another performance end detection processing of FIG. 12 returns to the step S1201. On the other hand, in the case of being determined in the step S1203 that the registered user ID that matches the acquired user ID is the user ID of the performer who has logged in, the another performance end detection processing of FIG. 12 proceeds to a step S1204. In the step S1204, as in the step S712 described above, the CPU 301 detects the end of the performance by the performer. Thereafter, the another performance end detection processing of FIG. 12 ends.

In this way, by detecting that the user ID used in the login processing has been acquired again from the QR code or the IC card, the end of the performance by the performer is detected. As a result, it is possible to reliably detect that the performance has finished.

Further, in the present preferred embodiment, regarding the detection of the start of the performance, the start of the performance by the performer may be detected by detecting that a lid of the street piano is opened. Similarly, regarding the detection of the end of the performance, the end of the performance by the performer may be detected by detecting that the lid of the street piano is closed. By performing the detection of the start of the performance and the detection of the end of the performance in this manner, it is possible to detect the start of the performance and the end of the performance without causing the performer to perform an operation not related to the performance.

It should be noted that the opening and the closing of the lid of the street piano may be detected, for example, by installing a sensor on the lid of the street piano. Alternatively, the image processing unit 303 of the server 300 may detect the opening and the closing of the lid of the street piano by performing the image analysis with respect to the moving image content received from the photographing apparatus 200.

Furthermore, in the present preferred embodiment, regarding the detection of the start of the performance and the detection of the end of the performance, collected sound data (the sound data collected from the microphone) of the microphone attached to the photographing apparatus 200 may be used. Specifically, the sound processing unit 208 of the photographing apparatus 200 performs a sound analysis processing with respect to the collected sound data. For example, the start of the performance by the performer is detected by detecting that a sound produced by a keystroke or a sound has become louder than a predetermined value. In addition, the end of the performance by the performer is detected by detecting that the sound becomes smaller than the predetermined value and a predetermined period of time has elapsed. By performing the detection of the start of the performance and the detection of the end of the performance in this manner, it is possible to detect the start of the performance and the end of the performance based on the sound produced during the performance.

In addition, regarding the detection of the end of the performance, the end of the performance by the performer may be detected by detecting that a predetermined period of time has elapsed after the performer has logged in or the performer has started the performance.

In addition, the control may be performed so that the end of the performance is able to be detected even in the case that the performer forgets to close the lid of the street piano or to read the QR code even though the performer has finished the performance. For example, the end of the performance by the performer may be detected by detecting that a predetermined period of time set in advance has elapsed after the performer opens the lid of the street piano. In addition, the end of the performance by the performer may be detected by detecting that a predetermined period of time set in advance has elapsed after reading the QR code or the IC card at the time of login.

It should be noted that, in the preferred embodiment described above, the case that the performer plays the street piano has been described, but the musical instrument played by the performer is not limited to the street piano and may be another musical instrument such as a drum.

Furthermore, in the preferred embodiment described above, the case that the performer plays a fixed musical instrument such as the street piano as an example of the performance has been described, but the present invention is not limited to such a case. For example, the present invention can also be applied to a case of delivering the performance such as a street performance, in which different tools are used for respective performers. It should be noted that, in the case of delivering the performance such as the street performance, since a method for detecting the start of the performance and the end of the performance is different from the preferred embodiment described above, the method in the case of delivering the performance such as the street performance will be described below.

Figure 13A:
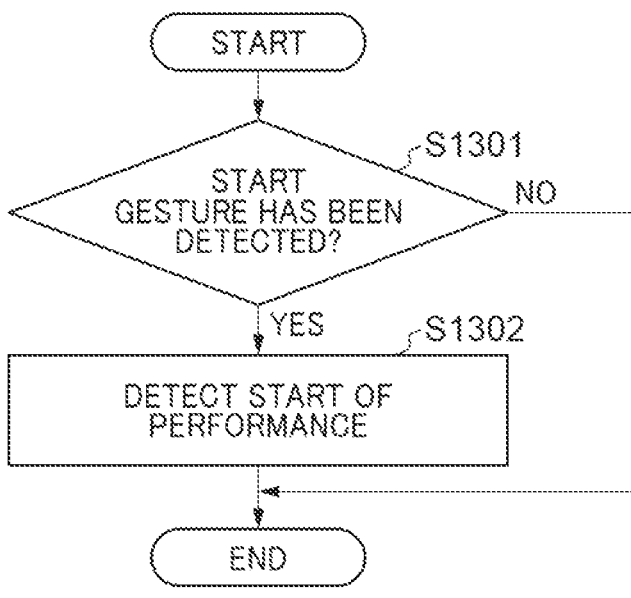
FIG. 13A is a flowchart that shows a procedure of another performance start detection processing executed in the server shown in FIG. 1.
Figure 14A:
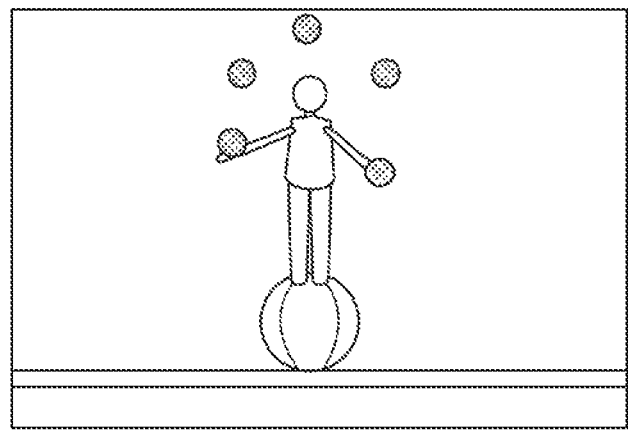
FIGS. 14A, 14B, and 14C are diagrams that show an example of a moving image content generated by photographing a performer delivering a performance that is a street performance.

FIG. 13A is a flowchart that shows a procedure of another performance start detection processing executed in the server 300 shown in FIG. 1. The another performance start detection processing is realized by the CPU 301 executing the control programs stored in the primary storage unit 302, the working memory 309, and the recording and reproducing unit 305. In the another performance start detection processing, it is assumed that the server 300 receives a moving image content, which is generated by photographing a performer delivering a street performance as shown in FIG. 14A, from the photographing apparatus 200. It should be noted that the another performance start detection processing of FIG. 13A is a processing similar to the performance start detection processing of FIG. 7A described above, and in particular, contents different from the performance start detection processing of FIG. 7A will be described below.

Figure 14B:
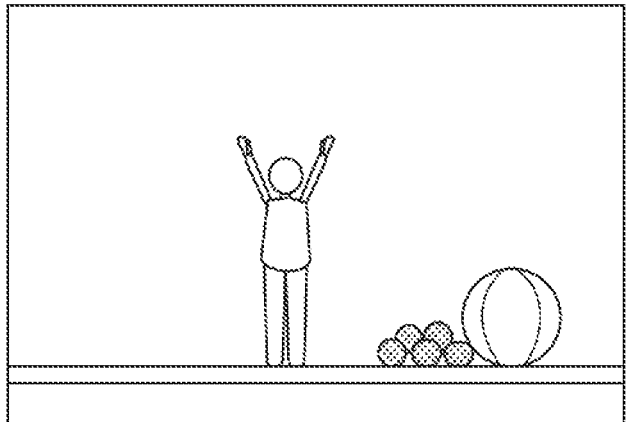

As shown in FIG. 13A, the CPU 301 determines whether or not a start gesture set in advance has been detected (a step S1301). In the step S1301, the CPU 301 controls the image processing unit 303 to perform the image analysis with respect to the moving image content received from the photographing apparatus 200 and detect the start gesture. The start gesture is a start suggesting action that indicates the start of the performance and is, for example, an action of raising both hands as shown in FIG. 14B.

In the case of being determined in the step S1301 that the start gesture has not been detected, the another performance start detection processing of FIG. 13A ends. On the other hand, in the case of being determined in the step S1301 that the start gesture has been detected, similarly to the step S702 described above, the CPU 301 detects the start of the performance by the performer (a step S1302). Thereafter, the another performance start detection processing of FIG. 13A ends.

Figure 13B:
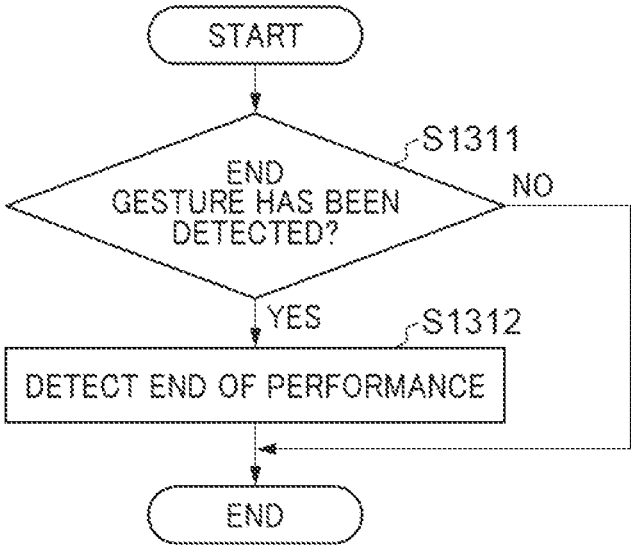
FIG. 13B is a flowchart that shows a procedure of still another performance end detection processing executed in the server shown in FIG. 1.

FIG. 13B is a flowchart that shows a procedure of still another performance end detection processing executed in the server 300 shown in FIG. 1. The still another performance end detection processing of FIG. 13B is realized by the CPU 301 executing the control programs stored in the primary storage unit 302, the working memory 309, and the recording and reproducing unit 305. It should be noted that the still another performance end detection processing of FIG. 13B is a processing similar to the performance end detection processing of FIG. 7B described above, and in particular, contents different from the performance end detection processing of FIG. 7B will be described below.

Figure 14C:
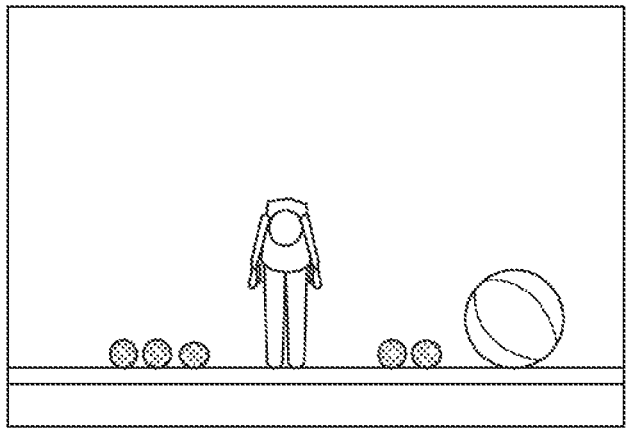

As shown in FIG. 13B, the CPU 301 determines whether or not an end gesture set in advance has been detected (a step S1311). In the step S1311, the CPU 301 controls the image processing unit 303 to perform the image analysis with respect to the moving image content received from the photographing apparatus 200 and detect the end gesture. The end gesture is an end suggesting action that indicates the end of the performance and is, for example, a bowing action as shown in FIG. 14C.

In the case of being determined in the step S1311 that the end gesture has not been detected, the still another performance end detection processing of FIG. 13B ends. On the other hand, in the case of being determined in the step S1311 that the end gesture has been detected, similarly to the step S712 described above, the CPU 301 detects the end of the performance by the performer (a step S1312). Thereafter, the still another performance end detection processing of FIG. 13B ends.

As described above, in the preferred embodiment described above, the start of the performance by the performer is detected by detecting that the performer has performed the start suggesting action set in advance. In addition, the end of the performance by the performer is detected by detecting that the performer has performed the end suggesting action set in advance. As a result, in a performance not using the musical instrument or the like, it is possible to detect the start and the end of the performance by the performer.

In the present preferred embodiment, regarding the detection of the start of the performance such as the street performance, the start of the performance by the performer may be detected by detecting a person at a predetermined position or within a predetermined area set in advance by means of the image analysis of the moving image content. As a result, in the performance not using the musical instrument or the like, it is possible to detect the start of the performance by the performer without forcing the performer to perform the start suggesting action.

Furthermore, in the present preferred embodiment, regarding the detection of the start and the end of the performance such as the street performance, the collected sound data of the microphone attached to the photographing apparatus 200 may be used. Specifically, the start of the performance by the performer is detected by detecting that a sound of background music played during the performance has become louder than a predetermined value. In addition, the end of the performance by the performer is detected by detecting that the sound of background music becomes smaller than the predetermined value and a predetermined period of time has elapsed.

Furthermore, in the present preferred embodiment, the method used for detecting the start and the end of the street piano performance described above may be used to detect the start and the end of the performance such as the street performance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-177415, filed on Nov. 4, 2022, which is hereby incorporated by reference herein in its entirety.

What is claimed is:

1. A content distribution system comprising:
   a distribution unit configured to distribute a moving image content obtained by a photographing apparatus capturing a plurality of performers playing a street piano by turns;
   a login control unit configured to perform a login processing of a performer of the plurality of performers who starts a performance on the street piano;
   a start detection unit configured to detect a start of the performance on the street piano by the performer who has logged in through the login processing;
   an end detection unit configured to detect an end of the performance on the street piano by the performer who has logged in through the login processing by detecting that the performer who has logged in through the login processing has left a chair for the performer who has logged in through the login processing, the chair being located near the street piano;
   a reception unit configured to receive a tip from a viewer of the distributed moving image content; and
   a control unit configured to associate information corresponding to the tip received during a period from the start to the end of the performance on the street piano by the performer who has logged in through the login processing with information corresponding to the performer who has logged in through the login processing.

2. The content distribution system according to claim 1, wherein
   the login control unit performs the login processing based on information corresponding to the performer who starts the performance on the street piano, the information being acquired by reading code information displayed on a mobile terminal possessed by the performer who starts the performance on the street piano.

3. The content distribution system according to claim 1, wherein
   the login control unit performs the login processing based on information corresponding to the performer who starts the performance on the street piano, the information being acquired by reading a card possessed by the performer who starts the performance on the street piano.

4. The content distribution system according to claim 1, further comprising:
   a face detection unit configured to perform a face detection processing, and
   wherein the login control unit performs the login processing based on face information detected in the moving image content.

5. The content distribution system according to claim 1, wherein
   the start detection unit detects the start of the performance on the street piano by the performer who has logged in through the login processing by detecting that the performer who has logged in through the login processing is seated in the chair for the performer.

6. The content distribution system according to claim 1, wherein
   the start detection unit detects the start of the performance on the street piano by the performer who has logged in through the login processing by detecting that the performer who has logged in through the login processing has arrived at a predetermined position or a predetermined area set in advance.

7. The content distribution system according to claim 1, wherein the start detection unit detects the start of the performance on the street piano by the performer who has logged in through the login processing by detecting that a lid of the street piano to be played by the performer who has logged in through the login processing is opened.

8. The content distribution system according to claim 1, wherein the start detection unit detects the start of the performance on the street piano by the performer who has logged in through the login processing by detecting that a sound collected by the photographing apparatus has become louder than a predetermined value.

9. The content distribution system according to claim 1, wherein the start detection unit detects the start of the performance on the street piano by the performer who has logged in through the login processing by detecting that the performer who has logged in through the login processing has performed a start suggesting action set in advance.

10. A content distribution method comprising:

distributing a moving image content obtained by a photographing apparatus capturing a plurality of performers playing a street piano by turns;

performing a login processing of a performer of the plurality of performers who starts a performance on the street piano;

detecting a start of the performance on the street piano by the performer who has logged in through the login processing;

detecting an end of the performance on the street piano by the performer who has logged in through the login processing by detecting that the performer who has logged in through the login processing has left a chair for the performer who has logged in through the login processing, the chair being located near the street piano;

receiving a tip from a viewer of the distributed moving image content; and associating information corresponding to the tip received during a period from the start to the end of the performance on the street piano by the performer who has logged in through the login processing with information corresponding to the performer who has logged in through the login processing.

11. A non-transitory computer-readable storage medium storing a program for causing a computer to execute a content distribution method, the content distribution method comprising:

distributing a moving image content obtained by a photographing apparatus capturing a plurality of performers playing a street piano by turns;

performing a login processing of a performer of the plurality of performers who starts a performance on the street piano;

detecting a start of the performance on the street piano by the performer who has logged in through the login processing;

detecting an end of the performance on the street piano by the performer who has logged in through the login processing by detecting that the performer who has logged in through the login processing has left a chair for the performer who has logged in through the login processing, the chair being located near the street piano;

receiving a tip from a viewer of the distributed moving image content; and associating information corresponding to the tip received during a period from the start to the end of the performance on the street piano by the performer who has logged in through the login processing with information corresponding to the performer who has logged in through the login processing.

* * * * *